Aug. 31, 1948.                J. L. TURNER                2,448,403
                   APPARATUS FOR MAINTAINING OPTIMUM
                      CONDITIONS IN GASEOUS MEDIUMS
Filed Nov. 11, 1943                                   3 Sheets-Sheet 3

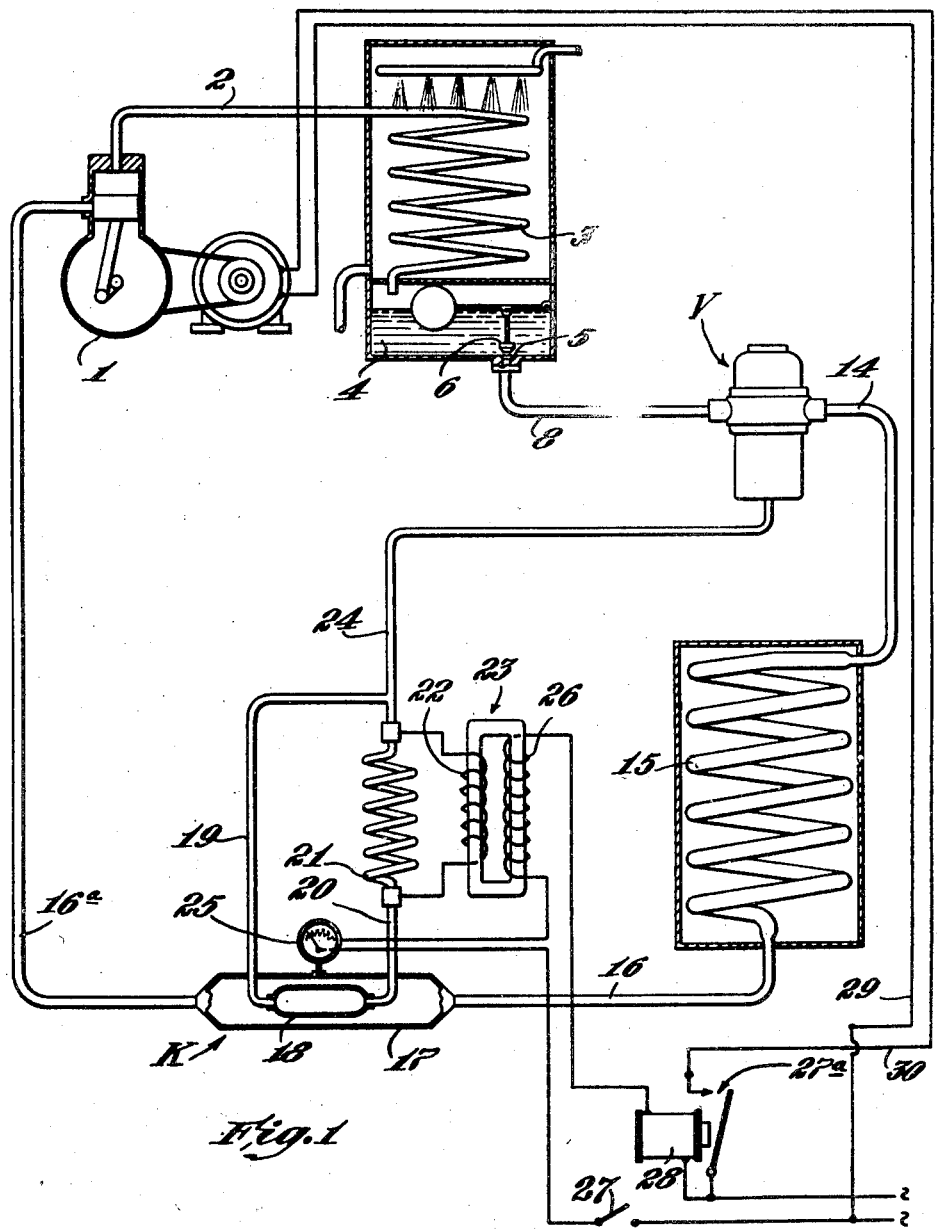

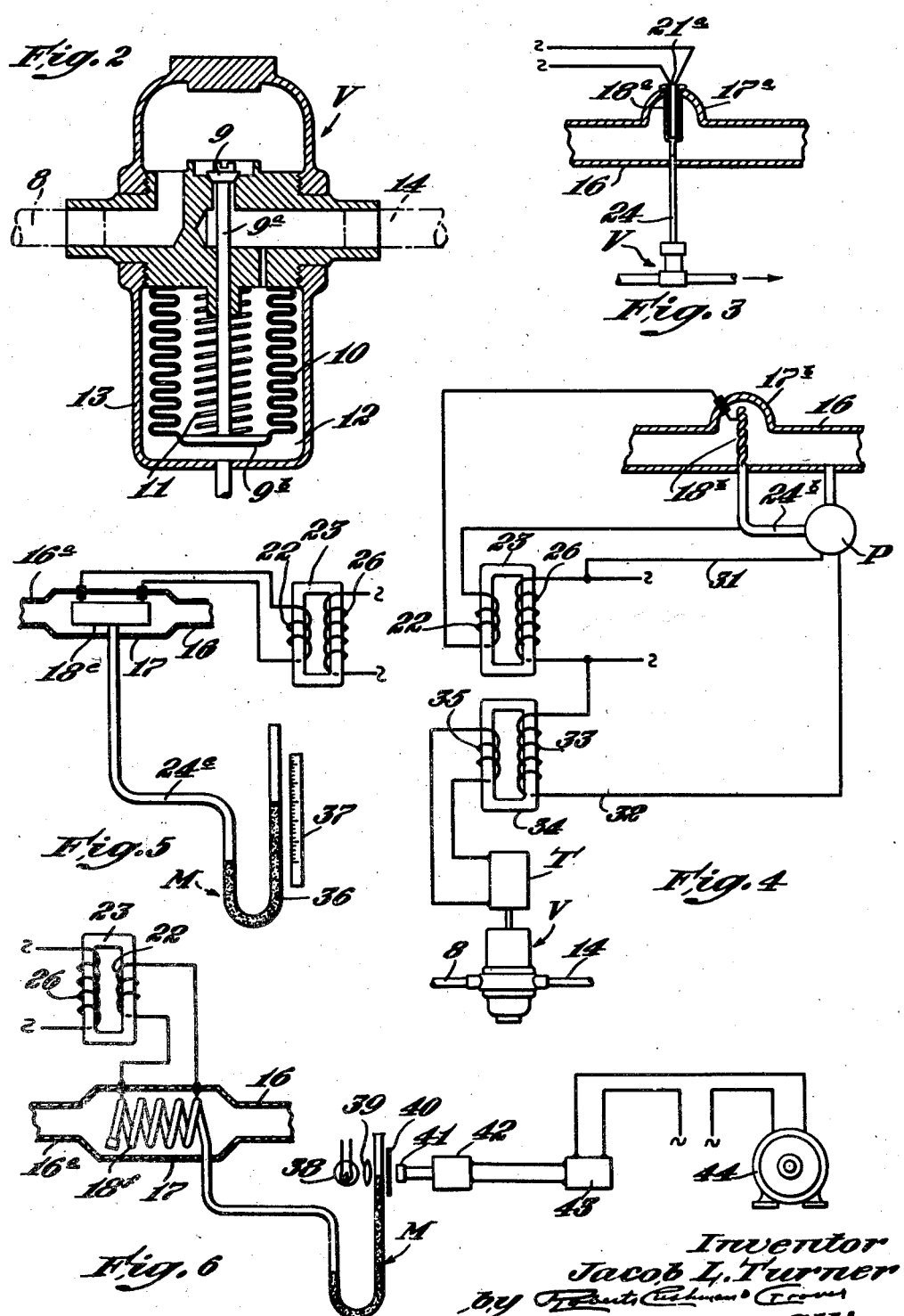

Inventor
Jacob L. Turner

Patented Aug. 31, 1948

2,448,403

UNITED STATES PATENT OFFICE 2,448,403

APPARATUS FOR MAINTAINING OPTIMUM CONDITIONS IN GASEOUS MEDIUMS

Jacob L. Turner, Norwell, Mass., assignor to Manning, Maxwell & Moore, Incorporated, New York, N. Y., a corporation of New Jersey Application November 11, 1943, Serial No. 509,856

6 Claims. (Cl. 62—8)

This invention relates to control apparatus, and more particularly to apparatus which is sensitively responsive to the presence of small particles, solid or liquid, in a gaseous medium, for instance a normally superheated vapor.

In many processes and types of apparatus dealing with gases or vapors, for example in gas purification; in the employment of dry saturated steam or superheated or other vapors, for example in steam engineering; in chemical processes; for mechanical purposes; in refrigeration, etc., it would frequently be of great advantage if the presence of solid particles or liquid droplets in the gaseous medium could be caused to manifest itself automatically either by the actuation of a signal or by initiating the operation of valves or other devices designed automatically to restore conditions to normal or to stop further operation until normal conditions have been otherwise restored.

It is well recognized that heat is transferred more rapidly between two solids or a solid and a liquid than between a solid and a gaseous medium (gas or true vapor). In accordance with the present invention this principle is made use of to determine for instance the presence of solid particles (dust) in a gas; the presence of undesired droplets of water, oil or the like in a dry saturated or superheated vapor; or the increase or decrease in the amount of such droplets of liquid in a normally wet vapor. Since the solid particles or droplets of liquid are ordinarily at the same or substantially the same temperature as the gaseous medium in which they are suspended and since the temperature and/or pressure of the gaseous medium may vary from time to time, it has heretofore been deemed impossible, as a practical matter, to determine the presence, by automatic means, of such solid particles or droplets of liquid or to provide for the automatic operation of regulating or controlling means, for instance means for so varying conditions as to prevent the introduction or formation of such droplets of liquid.

In accordance with the present invention, there is disposed within the container for the gaseous medium, for instance a conduit through which the gaseous medium flows, a hollow body (hereinafter referred to as a boiler) containing a fluid medium which volatilizes and condenses, or which expands and contracts very rapidly in response to temperature change. The interior of this hollow body or boiler communicates with a device in which a part or element moves in response to the varying pressure exerted by the fluid medium in the hollow body, and thereby operates or causes to operate an appropriate regulating means, signal, or other apparatus. This hollow body or boiler is normally maintained at a temperature slightly different from that of the gaseous medium in the container or conduit, for example the hollow body may be heated electrically or it may be refrigerated by a refrigerating fluid. Whatever means be provided for normally maintaining the desired temperature differential, said means should preferably be responsively sensitive to variations in pressure or temperature of the gaseous medium in the container in order that such temperature differential may be kept constant.

The heat input (or withdrawal) should be such as to compensate for heat losses in the connections and by reason of any circulation of the fluid in the hollow body or boiler or in the passages leading therefrom, and under normal and proper conditions (degree of purity, wetness, superheat, or the like) of the gaseous medium, to keep the hollow body or boiler at a temperature slightly different (whether warmer or cooler) than that of the gaseous medium. Assuming the maintenance of such a normal temperature differential, the presence of solid particles or liquid droplets (even though such particles or droplets be at the same temperature as the gaseous medium in which they are suspended) is immediately manifest, since upon impact or contact of such particles or droplets upon or with the shell of the boiler there is a sudden variation in the rate of transfer of heat to or from the boiler shell. The fluid within the boiler shell thereupon contracts or expands and the variation in pressure thus occasioned at the motor or other control device actuates the latter, thereby for example, correcting the condition of the gaseous medium; actuating a signal, or affecting the operation of apparatus in which the gaseous medium is employed.

The present invention has for one of its principal objects the provision of means which is very sensitively responsive to the presence of solid particles or liquid droplets in a gaseous medium, and which by its response thereto may be made to accomplish corrective results or to actuate a signal or the like.

In refrigerating systems of the compression type it is highly important to maintain the fluid in the suction line in a dry saturated or slightly superheated condition, since any departure from such condition, with concomitant formation of droplets in the flowing fluid is not only uneconomical from the thermodynamic standpoint but also may result in mechanical damage to the compressor, since the presence of highly incompressible liquid in the compressor cylinder may result in cracking or blowing off the cylinder head. A further and more specific object of the present invention is to provide control means for use in a refrigerating system, said control means including an element which is sensitively responsive to the presence of droplets of liquid in the suction line, and which by such response (through appropriate motor means) operatively actuates the expansion valve of the refrigerating system in such a way as to restore conditions in the suction pipe to normal.

A further object is to provide an improved refrigerating apparatus wherein the flow of fluid to the evaporator is automatically controlled in response concomitantly to variations in the liquid level in the condenser and/or cooler and to variations in the pressure and temperature in the suction line. Other and further objects and advantages of the invention will be pointed out in the following more detailed description and by reference to the accompanying drawings, wherein Fig. 1 is a diagram illustrating a refrigerating system of the compression type embodying the present invention;

Fig. 2 is a vertical section, to larger scale, illustrating the pressure motor actuated expansion valve of Fig. 1;

Fig. 3 is a fragmentary diagrammatic view illustrating a modification of the control apparatus shown in Fig. 1;

Fig. 4 is a fragmentary diagrammatic view illustrating a further modification of the control apparatus;

Fig. 5 is a diagrammatic elevation showing the principle of the present invention as applied to the operation of indicating means;

Fig. 6 is a similar view but showing a control embodying electronic feature;

Figure 7:
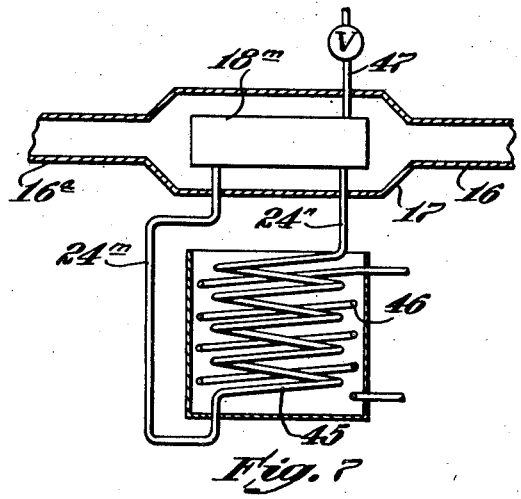
Fig. 7 is a modified type of control in which the sensitive element is refrigerated.

Referring to the drawings and particularly to Fig. 1, the numeral 1 designates an electrically driven compressor of conventional type, either single stage or multiple stage, having the high pressure delivery pipe 2 which leads to the receiving end of the condensing coil 3. This coil is cooled, for example, by a water spray, and the refrigerating medium, thus condensed to a liquid, flows into the closed chamber 4 in the lower part of the condenser. The outlet 5 from this chamber 4 is preferably, in accordance with the present invention, controlled by a float-actuated valve 6, which only opens to permit liquid to escape when the liquid level in the chamber 4 reaches a predetermined height. A high pressure pipe 8 leads from the delivery orifice 5 to the pressure-motor actuated expansion valve V.

The expansion valve V has a seat or orifice which is controlled by a valve 9 having a stem 9ª whose lower end is connected to the head 9ᵇ of a metallic bellows 10. A spring 11 tends to close the valve 9. The bellows 10 is housed in a fluid tight casing 13 and the space within this casing (outside of the bellows defines the expansible-contractible chamber 12 of a pressure-motor, the bellows constituting the movable wall of said chamber.

This expansion valve (Fig. 2) may be of any suitable type and is interposed between the high and low pressure sides of the system. The refrigerating medium which is permitted to pass through this valve V is conveyed by the pipe 14 to the expansion coil 15 of the cooler. In this coil the refrigerating medium again expands to gaseous or vapor form, the delivery end of the coil 15 being connected, through the pipes 16 and 16ª, to the suction side of the compressor, so that in the pipes 16 and 16ª a low pressure is always maintained—the compressor thus being interposed between the low and high pressure sides of the system.

In accordance with the present invention and in order to maintain a predetermined optimum working condition of the refrigerating medium in the low pressure side of the system, an automatic controller K is interposed between the pipe sections 16 and 16ª. As shown in Fig. 1, this controller comprises a casing or housing 17, of somewhat larger diameter than the pipe 16, within which is placed a thin-walled hollow bulb or capsule 18 (the "boiler" above referred to) of a material which is a very good conductor of heat. Capillary tubes 19 and 20 lead from the opposite ends of this bulb or capsule 18. The outer end of the tube 20 is connected to a coil 21 of metal tubing which is resistant to electric current and preferably electrically insulated at its opposite ends from other metallic parts. The opposite ends of this coil 21 are connected to the terminals of the secondary 22 of a transformer 23. The upper ends of tube 19 and coil 21, as shown in Fig. 1, are united and connected by a pipe 24 to the pressure chamber 12 of the expansion valve V.

The bulb or capsule 18, the tubes 19 and 20, the coil 21, the pipe 24 and the motor chamber 12 of the valve V are normally filled with a liquid which is very volatile and whose pressure thus varies very quickly in response to temperature change.

Preferably a pressure-sensitive circuit controller 25 is mounted on the casing 17. This pressure-sensitive circuit controller may be of conventional type, for example an instrument including a sensitive Bourdon tube as a pressure motor means or a diaphragm or its equivalent. This device may be of the type in which a lever contact moves successively over a series of contacts connected to taps on a resistor, or it may be a device which varies the flow of current by changing the total impedance in the circuit. Whatever the exact nature of the device 25 may be, it is connected in series with the primary 26 of the transformer 23 and also in series with the coil of a relay 28. The relay actuates a switch, 27ª, which controls the energizing circuit of the compressor motor. When current flows through the primary 26 of the transformer, heating current is thereby caused to flow through the tubular resistance coil 21 so as to heat the volatile fluid in the coil and thus heat the fluid in the bulb or boiler 18. However, the intensity of current flow through the primary 26 will depend upon the setting of the pressure-responsive circuit controller 25, so that the temperature of the fluid medium in the bulb 18 will vary in accordance with the pressure in the suction line 16. By proper adjustment of the instrument 25 it is thus possible to maintain the fluid within the bulb 18 at a temperature, which, in accordance with the present invention, should be very slightly higher (for example, from 3 to 12° F.) than the temperature of the gaseous medium in the suction line regardless of the pressure which may at any instant prevail in the suction line.

A manually actuable switch 27 controls the supply of current to the transformer. When the relay current is energized, it closes the switch 27ᵃ which starts the motor. It will be noted that by reason of the provision of the float-actuated valve 6 in the high pressure side of the system, it is impossible for refrigerating fluid in the gaseous state to enter the expansion valve.

Assuming that the switch 27ᵃ has been closed and the compressor started and that there is condensed refrigerating fluid in the chamber 4 sufficient to open the valve 6, some of this fluid flows to the valve V and is permitted by the latter to enter the pipe 14, the degree to which the expansion valve 9 is lifted from its seat determining the rate at which the liquid may enter the expansion coil 15. The pump maintains suction in the expansion coil 15 and also in the pipe 16, the casing 17 and the pipe 16ᵃ, thus causing the expanded refrigerating medium in a gaseous or vapor state to flow through the chamber defined by the casing 17. So long as this gaseous medium is dry saturated or superheated the temperature differential between the contents of the bulb 18 and the surrounding gaseous medium (as determined by the heating effect of the current supplied by the transformer 23) remains nearly constant. However, substantially instantly upon the appearance of droplets of liquid in the flowing gaseous medium, the temperature of the bulb 18 and its contents will be reduced by reason of the more rapid transfer of heat between the liquid droplets and the metal of the bulb than between the dry gas and the metal of the bulb (although the droplets may be at the same temperature as the dry gas) and also because the liquid of the droplets absorbs the heat required for vaporization at a constant temperature (assuming a constant pressure). Instantly upon the change in temperature of the contents of the bulb or "boiler" 18 there is a corresponding drop in pressure which makes itself manifest in the chamber 12 of the expansion valve, thereby permitting the spring 11 to move the valve 9 toward its seat, thus decreasing the amount of liquid which enters the expansion coil 15 per unit of time and thus restoring the conditions in the coil 15 and suction pipe 16 to normal, that is to say, to the condition of dry or superheated gas or vapor.

It has heretofore been common to try to maintain proper conditions in the suction line by the use of hand operated expansion valves; by the use of thermo-valves; pressure reducing valves, or float valves, or combinations thereof. However, hand operated valves require constant attention and are not readily regulated to produce optimum results; the rate of feed by a thermal valve is determined by the temperature of the suction line and little adjustment is made for changes in pressure; and pressure reducing valves work only on suction line pressures and make no allowance for temperature changes. It is thus difficult, with previous types of control valve to maintain a proper suction gas quality. In accordance with the present invention, the deficiencies of previous types of apparatus have been substantially eliminated. In the present apparatus only liquid can be fed to the expansion coil—no liquid is fed when the machine is idle; and when liquid is being fed it is so controlled that the gas in the suction line is definitely maintained at a dry saturated condition so that the compressor is enabled to do a maximum amount of work, and thus the machine will work at its most efficient point for a given pressure differential.

In Fig. 3 a slight modification of the control apparatus is illustrated wherein the pipe 24 which leads to the expansible-contractible chamber of the expansion valve V leads from a hollow-walled cup 18ᵃ which is set into a chamber formed by an upward bulge 17ᵃ in the suction pipe 16. Within this hollow-walled cup which constitutes the "boiler" there is placed a conventional cartridge type electrical heating unit 21ᵃ which may be connected to the secondary 22 of the transformer 23, in the same way as the coil 21 of Fig. 1; or to the line voltage. It is understood that the tube 24 and the hollow-walled cup 18ᵃ will be filled with the volatile fluid and that this fluid will be maintained at a constant temperature differential by means of the unit 21ᵃ. Pressure inside of the bellows 10 changes with suction pressure and partially compensates for change in the dry saturated temperature of the gas with changes in pressure. In Fig. 4 a further slight modification is illustrated wherein the suction pipe 16 is furnished with an upward bulge 17ᵇ providing a chamber within which is housed a "boiler" comprising a spiral coil or bulb of capillary tubing which communicates with a pressure-responsive element, for example a sensitive Bourdon tube of a pressure-actuated current controller, for instance a variable resistance, impedance or a switch P. The spiral coil or bulb 18ᵇ and the tube 24ᵇ are filled with volatile fluid and when the temperature of the spiral bulb 18ᵇ is varied the switch device P is thereby actuated. The bulb 18ᵇ is a tubular resistance coil of metal and is connected in series with the secondary 22 of a transformer 23. The primary 26 of this transformer is connected to a supply line in the same way as the primary of the transformer 23 of Fig. 1. Connected in parallel with this primary 26 is the switch device P and the primary 33 of a second transformer 34. The secondary of this latter transformer is connected in series with a thermally responsive motor device T which may be of the type disclosed, for example in the co-pending application of Turner, Serial No. 506,439, filed October 15, 1943. now Pat. No. 2,433,493, issued December 30, 1947, and which actuates the expansion valve B of the refrigerating system.

In each of the devices shown in Figs. 3 and 4, the arrangement of the bulb within the suction pipe is such as to avoid any possibility of accumulation of liquid in the suction pipe in the vicinity of the bulb. As shown, the arrangement of Fig. 3 responds solely to temperature and no provision is shown for varying the heat supply to the bulb in accordance with variations in suction pressure, but it is manifest that such pressure-responsive feature may be included as in the arrangement of Fig. 1.

In Fig. 5 a simpler type of arrangement is shown wherein the presence of liquid drops in the gaseous medium is merely indicated visually without any provision for control of fluid conditions. In this arrangement the bulb 18ᵉ is arranged in the casing 17 in the suction line as before. However, this bulb is a thin-walled metal cylinder or boiler of a material which is highly resistant to the flow of electrical current and the ends of this cylindrical boiler are connected in series with the secondary 22 of the transformer 23. The interior of this boiler 18ᵉ is connected by a capillary tube 24ᵉ to one vertical leg of the manometer M. The manometer tube may contain a suitable liquid, for example oil or mercury, and the rise and fall of this liquid in the other leg of the tube may be noted by reference to a scale 37. When the liquid level stands above a predetermined point on the scale, the operator is assured that the gas in the suction line is dry or superheated, but if the liquid level fall, the observer will known that droplets of liquid are impacting the boiler 18ᵉ and will thus be warned to correct this condition.

In Fig. 6 a still further modification is illustrated designed to respond with extreme sensitiveness. In this instance the tubular resistance coil or bulb or "boiler" 18ᶠ is of small thin-walled capillary metal tubing one end of which is connected to or integral with one leg of the manometer M. The manometer is filled with some opaque or colored liquid which does not mix with the volatile fluid within the coil 18ᶠ and the opposite leg of the manometer is placed in the path of a beam of light from a light source 38, the beam being directed, if desired, by a lens 39. At the opposite side of the manometer tube this beam of light passes through a diaphragm 40 and impinges upon a photoelectric cell 41 which is connected into an amplifying circuit in an amplifier mechanism 42. The amplified current from this amplifier operates a relay 43 which in turn controls the operation of a motor 44 which may be designed to operate any desired type of apparatus, for example, the expansion valve of the refrigerating system. When the temperature of the spiral bulb 18ᶠ varies by even the slightest degree, the level of the liquid in the free end of the manometer tube will change slightly, thus varying the amount of light falling on the photoelectric cell 41 and thus causing actuation of the motor.

Obviously, instead of the manometer M, a pressure-responsive device like the instrument P of Fig. 4 may be connected to bulb 18ᶠ, and the device P connected to the amplifier 42 so that current variations induced in the instrument P will be made available to control the motor.

In Fig. 7 an arrangement is shown wherein the thermally sensitive bulb or boiler 18ᵐ within the casing 17 in the suction line is refrigerated rather than heated. This bulb 18ᵐ may, for example, contain a gas which expands and contracts very rapidly with change in temperature and its interior is connected by tubes 24ᵐ and 24ⁿ to the opposite ends of a coil 45 placed in a refrigerating tank 46 containing a liquid which is kept at a predetermined temperature by a circulating refrigerant in a coil 46. The apparatus is so set that the normal temperature of the bulb 18ᵐ is slightly below the normal temperature of the gaseous medium flowing in the suction line 16. If under these circumstances droplets of liquid impinge upon the bulb 18ᵐ, the temperature will be quickly raised and thus the pressure of the gas in the bulb will be varied. A capillary tube 47 leads from the bulb 18ᵐ to the expansible-contractible chamber of the motor of the expansion valve so that changes in pressure within the bulb 18ᵐ cause a proper operation of the expansion valve to correct improper conditions in the suction line.

Figure 8:
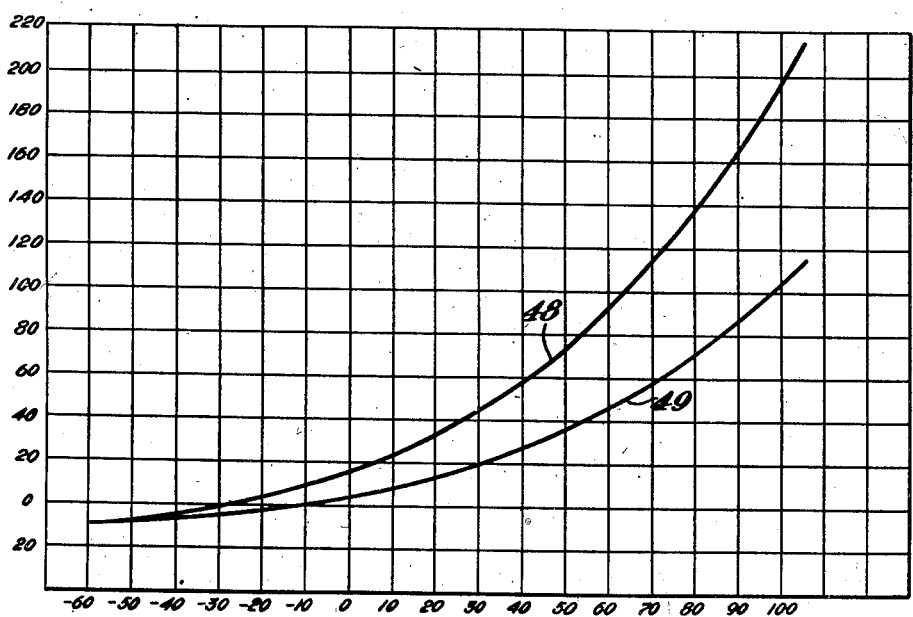
Fig. 8 is a diagram illustrating the pressure-temperature relation at constant volume of two common refrigerating fluids.

In Fig. 8 the pressure temperature curves for two common refrigerating fluids are shown. One of these curves 48 is that for ammonia gas, and the other 49 is for methyl chloride. These are the curves for constant quality, to wit, the dry saturated condition. It is manifest that in order for apparatus such as above described to operate accurately and properly, so as to always maintain optimum working conditions in the system, it is necessary that the heat supplied to the sensitively responsive bulb 18 be varied in accordance with variations in pressure in the suction line. As above pointed out, pressure variations are so compensated for by the provision of the pressure responsive controller 25. However, it is possible under certain circumstances, where, for example, the pressure normally varies but little during the operation of the apparatus, to dispense with this pressure control of the heat supply and merely to supply a substantially constant amount of heat to the bulb 18 by the use of proper electrical resistors or impedances.

The apparatus has been described with particular reference to application of the basic principle to refrigeration. However, it is contemplated that generally similar apparatus, operating on the same principle, may be used, for instance in regulating the quality of steam, in a steam supply main, or for determining or controlling the presence or amount of dust or other solid particles in a gas, and while certain desirable embodiments and utilities of the invention have been illustrated by way of example, it is to be understood that the invention is not necessarily limited to these precise embodiments or uses but is to be regarded as broadly inclusive of any and all modifications and applications of the basic principle falling within the terms of the appended claims.

I claim:

1. In combination with a container for a gaseous medium in which solid or liquid particles may at times be suspended, a boiler within the container, said boiler being filled with a volatile fluid, a device which is sensitively responsive to change in pressure in said volatile fluid, and heat-exchange means operative, so long as the condition of the gaseous medium is at a predetermined normal, to maintain a predetermined temperature differential between the contents of the boiler and the gaseous medium, and means for regulating the heat-exchange means in response to change in pressure of the gaseous medium.

2. In combination with a conduit through which flows vapor in which solid or liquid particles may at times be suspended, a hollow bulb within the conduit containing a volatile liquid, electrically energized heating means for the contents of the bulb, means for controlling the supply of electrical energy proportionately to the pressure of the vapor thereby normally to maintain the bulb at a temperature slightly above the corresponding dry saturated temperature of the vapor, the temperature of the bulb tending to change when the bulb is impacted by liquid particles entrained in the vapor, and motor means whose rate of operation varies in response to changes in temperature of the contents of the bulb.

3. In combination with a conduit through which flows vapor in which solid or liquid particles may at times be suspended, a hollow bulb within the conduit containing a volatile liquid, electrically energized heating means for the contents of the bulb, and means for varying the intensity of the heating current, said latter means being sensitively responsive to the pressure of the vapor in the conduit and thereby normally maintaining the bulb and the volatile liquid a few degrees above the dry saturated or superheated temperature of the vapor corresponding to the instant pressure, the bulb and its contents being cooled when the bulb is impacted by liquid particles entrained by the flowing gaseous medium, and motor means responsive to variations in the temperature of the contents of the bulb, and a valve for varying the rate of flow of the vapor through the conduit, said valve being controlled by the motor.

4. In a system wherein a gaseous medium is propelled through a conduit by a motor driven pump, a valve for modifying the rate of flow and thereby the pressure of the gaseus medium in the conduit, a hollow bulb within the conduit, a fluid pressure motor for adjusting the valve, said motor having an expansible-contractible chamber, means providing a passage connecting the interior of the bulb with the motor chamber, a portion at least of the passage being constituted by a length of capillary tubing, the bulb, passage and motor chamber being normally filled with a volatile liquid, means for electrically heating the capillary tubing and thereby the volatile liquid, a pressure-responsive current regulator operative in response to pressure variations in the conduit to determine the intensity of current supplied for heating the capillary tubing, the parts being so designed and arranged as normally to maintain the temperature of the volatile liquid slightly above the temperature of the gaseous medium corresponding to the instant pressure, and means for concomitantly controlling the current for actuating the pump motor and heating circuit.

5. In combination with a conduit through which flows a gaseous medium which at times may contain suspended liquid particles, a hollow bulb within the conduit and in the path of the gaseous medium, a coil of metallic capillary tubing, means providing passages leading from the opposite ends of the coil to spaced points within the bulb, a pressure motor having an expansible-contractible chamber, and means providing a passage leading from said chamber to one end of the coil, the coil, motor chamber and passage being normally filled with a volatile liquid, a valve actuated by the motor and which is operative to modify the rate of flow of the gaseous medium in the conduit, means connecting the coil into an electrical circuit whereby flow of current in the circuit heats the coil, and means normally maintaining such a current intensity as to heat the coil and the volatile liquid to a temperature slightly in excess of the dry saturated or superheated temperature of the gaseous medium in the conduit, the impact upon the bulb of liquid particles entrained by the gaseous medium lowering the temperature of the bulb and thereby causing operation of the motor and adjustment of the valve.

6. In combination with a conduit through which flows a gaseous medium which at times may contain suspended liquid particles, a hollow bulb within the conduit and in the path of the gaseous medium, a container having a thin metallic shell, means providing a passage leading from the container to the bulb, means operative to cause electrical current to traverse the shell of the container thereby to heat it, the bulb, container and passage being filled with a volatile liquid, means for so controlling the current as thereby normally to keep the bulb at a temperature slightly above the instant temperature of the gaseous medium, the temperature of the bulb being lowered below said normal temperature when the bulb is impacted by liquid particles entrained in the gaseous medium, and means operative in response to drop in pressure within the bulb to change the rate of flow of the gaseous medium.

JACOB L. TURNER.

REFERENCES CITED

The following references are of record in the file of this patent:

UNITED STATES PATENTS

| Number | Name | Date |
| --- | --- | --- |
| 1,314,249 | Crowell | Aug. 26, 1919 |
| 1,709,468 | Fassett | Apr. 16, 1929 |
| 1,874,520 | Hebler | Aug. 30, 1932 |
| 2,112,038 | McLenegan | Mar. 22, 1938 |
| 2,112,750 | Price | Mar. 29, 1938 |
| 2,112,791 | Small et al. | Mar. 29, 1938 |
| 2,291,898 | Holmes | Aug. 4, 1942 |